United States Patent
Lucas

(10) Patent No.: US 8,470,175 B2
(45) Date of Patent: Jun. 25, 2013

(54) SPACE REDUCING FILTER WITH SUPPLEMENTAL FLUID PROCESSING ELEMENT

(75) Inventor: Daniel Lucas, Fayetteville, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 216 days.

(21) Appl. No.: 12/881,866

(22) Filed: Sep. 14, 2010

(65) Prior Publication Data

US 2011/0062075 A1  Mar. 17, 2011

Related U.S. Application Data

(60) Provisional application No. 61/242,615, filed on Sep. 15, 2009.

(51) Int. Cl.
*B01D 27/00* (2006.01)
*B01D 29/00* (2006.01)
*B01D 35/00* (2006.01)

(52) U.S. Cl.
USPC ........... 210/256; 210/261; 210/295; 210/314; 210/315; 210/323.1; 210/335; 210/337; 210/338; 210/342; 210/DIG. 5

(58) Field of Classification Search
USPC ............. 210/335, 337, 338, 342, 458, DIG. 5
See application file for complete search history.

(56) References Cited

U.S. PATENT DOCUMENTS

| | | | |
|---|---|---|---|
| 2,864,505 A | 12/1958 | Kasten | |
| 3,228,527 A * | 1/1966 | McPherson | 210/307 |
| 3,262,572 A * | 7/1966 | Cook | 210/307 |
| 3,390,780 A * | 7/1968 | Bennett | 210/338 |
| 4,253,954 A * | 3/1981 | Midkiff et al. | 210/315 |
| 4,320,005 A * | 3/1982 | DeGraffenreid | 210/232 |
| 4,372,847 A * | 2/1983 | Lewis | 210/86 |
| 4,437,986 A * | 3/1984 | Hutchins et al. | 210/130 |
| 4,626,348 A | 12/1986 | Stone | |
| 5,447,627 A | 9/1995 | Loafman et al. | |
| 6,113,781 A | 9/2000 | Popoff et al. | |

(Continued)

FOREIGN PATENT DOCUMENTS

DE  2 251 130  5/1974
DE  34 40 506 A1  5/1986

(Continued)

OTHER PUBLICATIONS

International Search Report dated Nov. 15, 2010 and PCT/ISA/237 Form (Fifteen (15) pages).

(Continued)

*Primary Examiner* — Benjamin Kurtz
(74) *Attorney, Agent, or Firm* — Crowell & Moring LLP

(57) ABSTRACT

A fuel filter, such as a filter for filtering gasoline or diesel fuel to be supplied to an internal combustion engine, includes an annular main filter element through which fluid to be filtered can pass radially, and a supplemental fluid processing element disposed within the main filter element to which fluid discharged from the main filter element passes. The filter also has end caps, between which opposite ends of both the main filter element and the supplemental fluid processing element are disposed, and to which the opposite ends of both the main filter element and the supplemental fluid processing element are secured. Fluid is discharged from a central volume of the filter through one of the end caps.

12 Claims, 3 Drawing Sheets

U.S. PATENT DOCUMENTS

| | | |
|---|---|---|
| 6,319,402 B1 | 11/2001 | Schwandt et al. |
| 6,350,379 B1 | 2/2002 | Roll et al. |
| 6,666,968 B2 | 12/2003 | Smith et al. |
| 6,787,033 B2 | 9/2004 | Beard et al. |
| 7,014,761 B2 | 3/2006 | Merritt et al. |
| 7,090,773 B2 | 8/2006 | Meddock et al. |
| 7,527,739 B2 | 5/2009 | Jiang et al. |
| 2005/0252838 A1 | 11/2005 | Fisher |
| 2007/0084776 A1 | 4/2007 | Sasur |
| 2008/0078716 A1 | 4/2008 | Farmer |
| 2008/0245037 A1 | 10/2008 | Rogers et al. |
| 2009/0065425 A1 | 3/2009 | Jiang |
| 2009/0211959 A1 | 8/2009 | Clint et al. |
| 2010/0206800 A1 | 8/2010 | Veit et al. |

FOREIGN PATENT DOCUMENTS

| | | |
|---|---|---|
| DE | 20 2005 014451 U1 | 2/2007 |
| DE | 10 2008 020223 A1 | 9/2009 |
| EP | 08 58 825 A1 | 8/1998 |
| EP | 2 226 107 B1 | 4/2012 |

OTHER PUBLICATIONS

International Preliminary Report on Patentability and Written Opinion (seven (7) pages).

* cited by examiner

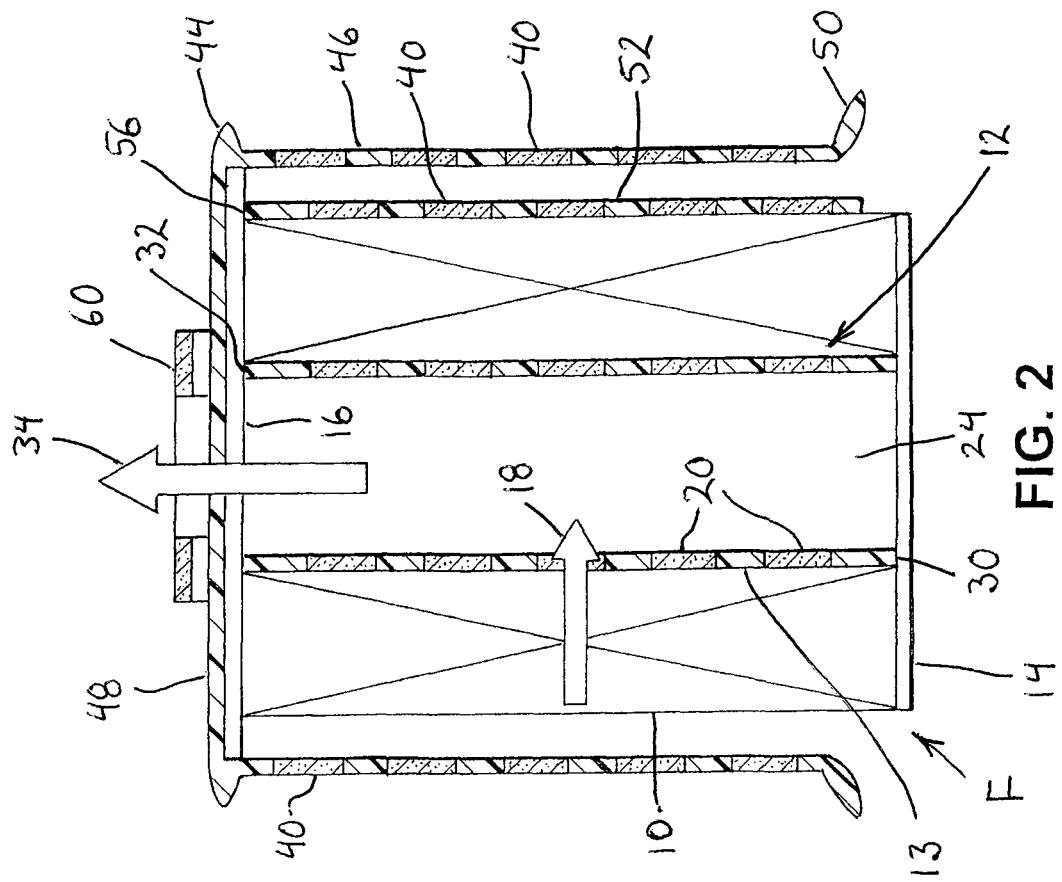
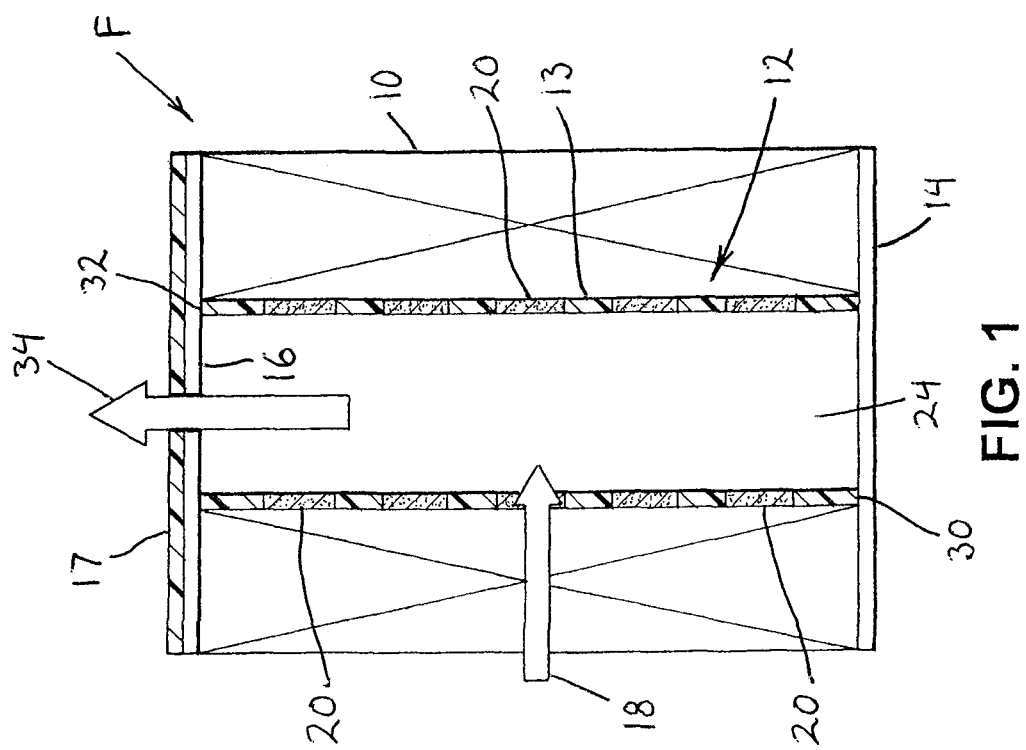
FIG. 1
FIG. 2

⊗ Diesel with dissolved air
○ Degassed air bubbles

SPACE REDUCING FILTER WITH SUPPLEMENTAL FLUID PROCESSING ELEMENT

This application claims priority to provisional U.S. Patent application 61/242,615, titled SPACE REDUCING FILTER WITH OVAL OR ROUND INNER DIAMETER, COALESCER, CCM/CLEANLINESS MEDIA GRADE, AND BUBBLE BREAKER, filed Sep. 15, 2009, the entire disclosure of which is incorporated herein.

Cross-reference is also made to the U.S. patent application based on provisional U.S. patent application 61/242,622, titled FILTER WITH OVAL OR FLAT-SIDES DESIGN, CCM/CLEANLINES MEDIA GRADE, AND BUBBLE BREAKER, also filed Sep. 15, 2009.

BACKGROUND OF THE INVENTION

1. Field of the Invention

The present invention concerns a filter, for fuel or other fluids, such as oil or other liquids, or even gases, that is oval or round in cross-sectional configuration. A design according to this invention permits different functions to be included in a compact oval or round filter design. An oval design is preferable to a flat design, as it more readily avoids collapse and makes it possible to integrate additional parts for cleanliness, water drainage for the clean side, and so on.

2. Description of Related Art

A brief discussion of certain filter systems for automotive or other applications utilizing multiple full flow and bypass filter arrangements is set forth in commonly assigned, co-pending U.S. patent application Ser. No. 12/467,423, filed May 18, 2009, titled Full Flow Liquid Filter With Integral Bypass Filtration. That discussion is partially reiterated here.

Filter systems for automotive or other applications commonly utilize one of two full flow filter and bypass filter configurations. One such configuration is an arrangement having two separate filtering systems, with a full flow system, which may include more than one filter, depending on flow requirements, and a bypass filter system, which processes only a small percentage of the full fluid volume. In such a configuration, an in-line, series approach is often utilized, with a full flow filter provided downstream of a bypass filter. These systems typically introduce additional costs and components for the automotive assembler and service industry to handle and manage. Vehicle weight is increased as well. U.S. Patent application publication 2008/0078716 to Farmer discloses one such in-line, series approach to filtering.

Evolutions of this configuration include systems having filters with full flow and bypass media stacked upon each other in the same filter housing. Examples of filters having stacked media include apparatuses disclosed by U.S. Patent application publication 2005/0252838 to Fisher and U.S. Pat. No. 5,447,627 to Loafman et al., U.S. Pat. No. 6,319,402 to Schwandt et al., and U.S. Pat. No. 6,350,379 to Roll et al.

Further developments have provided increased filtering capacity in the same or smaller footprint, while also offering high efficiency bypass filtration to "polish" the fluid system and provide integral soot filtration, by fitting bypass filters concentrically within full flow filters. U.S. Pat. No. 6,666,968 to Smith et al., U.S. Pat. No. 6,787,033 to Beard et al., U.S. Pat. No. 7,014,761 to Merritt et al., and U.S. Pat. No. 7,090,773 to Meddock et al. provide examples of such developments.

SUMMARY OF THE INVENTION

According to the invention, a fuel filter, such as a filter for filtering gasoline or diesel fuel to be supplied to an internal combustion engine, includes an annular main filter element through which fluid to be filtered can pass radially, and a supplemental fluid processing element disposed within the main filter element to which fluid discharged from the main filter element passes. The filter also has end caps, between which opposite ends of both the main filter element and the supplemental fluid processing element are disposed, and to which the opposite ends of both the main filter element and the supplemental fluid processing element are secured. Fluid is discharged from a central volume of the filter through one of the end caps.

The supplemental fluid processing element may be a supplemental cleanliness medium element or a coalescer to increase water droplet size. In either case, in the particular configurations disclosed, the supplemental fluid processing element includes a frame and multiple individual elements, for filtering or coalescing operations, retained by the frame. To avoid water contamination of fluid discharged from the filter, a hydrophobic medium may be disposed within the supplemental fluid processing element. Such a hydrophobic medium may surround the central volume circumferentially or bound the central volume at one of its ends.

The fluid filter may further comprise an additional fluid processing element, which may also surround the main filter to pre-process fluid supplied to the main filter. In one preferred arrangement, this additional fluid processing element is formed by another frame and multiple individual coalescer elements retained by the frame.

BRIEF DESCRIPTION OF THE DRAWINGS

FIG. 1 is a schematic sectional view of an oval or flattened annular main filter element with an associated supplemental cleanliness medium filter element.

FIG. 2 is a schematic sectional view of a configuration similar to that of FIG. 1, but showing a coalescer that surrounds the main filter element, a sealing lip, and a bubble breaker.

DETAILED DESCRIPTION OF THE INVENTION

Figure 4:
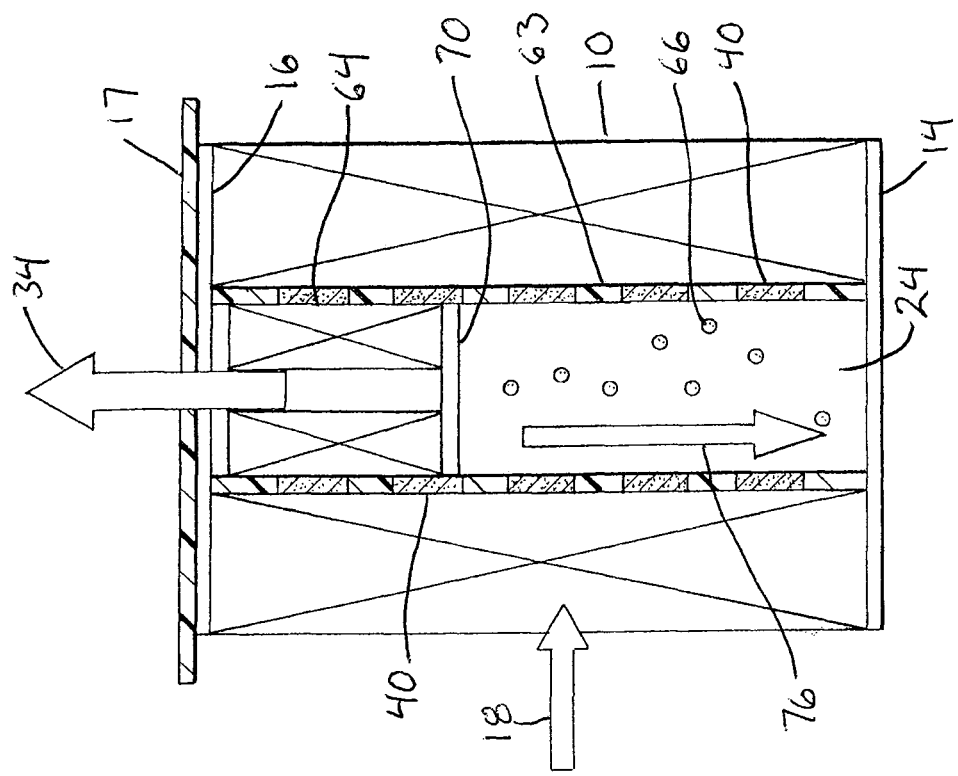
FIG. 4 is a sectional view of another compact three-stage design.

The same reference numbers or characters are used in the following discussion and in the drawings to identify elements shown in different drawing figures when those elements have the same or essentially the same structure and operation.

A schematic sectional view of an overall filter F, including a preferably oval or flattened annular main filter element 10 with an associated "component cleanliness management (CCM)" element and appropriate end caps, is provided by FIG. 1. The "CCM" element, which forms a supplemental fluid processing element, will be referred to subsequently as a supplemental cleanliness medium filter element, and is generally indicated in FIG. 1 by reference number 12. When the filter F is used in a fuel filtering application for a diesel fuel or gasoline powered internal combustion engine, for example, water-contaminated or dirty fuel received from a fuel tank (not shown) passes in a substantially radial direction 18 through the main filter element 10 under pressure, and is filtered initially by the annular main filter element 10. The main filter element 10 may be formed of cellulose and glass fibers, or cellulose, glass fibers, and hydrophobic meltblown material. The main filter element 10 may additionally include an appropriate scrim.

In its simplest configuration, the material constituting the main filter element 10 is glued or bonded in some other way to a first end cap 14, which may be solid, and a second, open-centered end cap 16. The end caps 14 and 16 are disposed at axially opposed ends of the main filter element 10. The annular main filter element 10 provides fine particle filtration to fluid as it passes through the filter element 10 in the direction 18.

Although a one-piece filter medium wrapped around a support frame or some other type of supplemental cleanliness medium filter configuration is usable, the supplemental cleanliness medium filter element 12 shown in FIG. 1 is defined by a frame or jacket 13 and multiple individual supplemental filter elements 20 received and retained in the frame or jacket 13. The frame or jacket 13 will be referred to subsequently as a "frame" or a "first frame." Each arrangement or design illustrated in FIGS. 1-6 is a "compact" arrangement or design, since the frame 13 and the filter elements 20, or a similar frame and fluid processing elements of at least one other type, are disposed centrally within and coaxial with the main filter element 10.

As illustrated in FIG. 1, one axial end 30 of the frame 13 is bonded or otherwise secured, together with an end of the main filter element 10, to the first end cap 14, while another axial end 32 of the frame 13 is bonded or otherwise secured, together with another end of the main filter 10, to the second end cap 16 opposite the first end cap.

FIG. 1 shows the second end cap 16 as glued or otherwise directly affixed to the underside of a partially illustrated filter container cover 17, which is securable to and removable from a filter container body (not shown) in which a filtering process occurs. Snaps, threads, or other such features may be used to interconnect the cover 17 and the container body. When the overall filter F shown in FIG. 1 becomes dirty or saturated, the cover 17 and the filter are removed together and replaced.

The main filter element 10 will not completely trap all particles in the fluid being filtered, and the elements 20 of the supplemental cleanliness medium filter element 12 have finer pores than those of the main filter element 10 to provide additional filtering. The supplemental cleanliness medium filter element 12, of course, could be configured in some other way to provide filtering beyond that provided by the main filter element.

The supplemental cleanliness medium filter element 12 accordingly operates to provide additional filtration of fluid that has already passed through the main filter element 10. By way of example only, and depending on customer requirements, the main filter element may operate at 86% efficiency, while the supplemental cleanliness medium filter element operates at 95% efficiency. After water-contaminated or dirty fluid passes through the main filter element 10, partially filtered fluid then passes through the supplemental cleanliness medium filter element 12, and then fully filtered fluid is received by a central filter cavity or volume 24. The fully filtered fluid then passes out of the overall filter F in a substantially axial direction 34.

FIG. 2 illustrates an overall filter F with a supplemental cleanliness medium filter element 12, defined by a first frame 13 and individual supplemental filter elements 20, that is essentially the same as the supplemental fluid processing element shown in FIG. 1. Again, one axial end 30 of the frame 13 is bonded or otherwise secured, together with an end of the main filter element 10, to a first end cap 14, while another axial end 32 of the frame 13 is bonded or otherwise secured, together with another end of the annular main filter element 10, to a second end cap 16 opposite the first end cap. In contrast to FIG. 1, FIG. 2 schematically illustrates the overall filter F as having a second frame 46 within which a plurality of individual coalescer elements 40 are mounted. Such coalescer elements serve in a known manner to pre-filter or pre-process fuel arriving from a fuel tank by increasing water droplet size, facilitating water repellency of hydrophobic media included in the main filter element 10. Typical coalescers are cellulose based or synthetic.

The second frame 46 shown has a circumferential lip 44, which may be receivable within a groove or recess defined on the interior of a fluid filter container cover (not shown in FIG. 2). By snapping the lip 44 into the groove or recess defined in the container cover, the second frame 46, including the individual coalescer elements 40 mounted therein, is securable to and interlocks with the container cover. The second end cap 16 is schematically shown in FIG. 2 as attached, by an annular layer of glue, for example, to an underside of an axial end wall 48 of the second frame 46. By attaching the first frame 13, with the individual supplemental cleanliness filter elements 20, and the second frame 46, including the individual coalescer elements 40, to the main filter element 10 by way of the second end cap 16 and the end wall 48, it is possible to produce an overall filter arrangement having combined main filtering, auxiliary filtering, and coalescing properties.

FIG. 2 also illustrates an annular lip extending around a bottom end of the second frame 46 to provide a seal between the second frame 46 and an external outer housing (not shown) within which the arrangement shown is received during use. More specifically, the second frame 46 illustrated in FIG. 2 has a circumferential lip 50 of plastic surrounding its open end opposite the annular axial end wall 48. The lip 50 is provided to produce a seal between the fluid filter container, within which the second frame 46 is received, and that second frame 46. The lip 50 thus facilitates fluid flow along an appropriate path.

Also illustrated in FIG. 2 is an optional further frame 52, within which another set of individual coalescer elements 40 are mounted. The further frame 52, which may be used in place of or in combination with the second frame 46, illustrates an alternative manner for securing coalescer elements in place within the arrangement. As FIG. 2 shows, an axial end 56 of the further frame 52 is bonded or otherwise secured, together with an end of the main filter 10 and the axial end 32 of the frame 13, to the second end cap 16.

The end wall 48 of the second frame 46 is also shown in FIG. 2 as having a schematically represented bubble breaker 60 formed or mounted on its end. The bubble breaker 60 is optional, includes an open medium, and may be integrated with the filter to dissolve or reduce sizes of air pockets or bubbles in fluid passing through the filter. Air pockets or bubbles entrained in fluid supplied to the interior of the fluid filter container (not shown) tend to rise within the container interior, and fluid pressure causes the bubbles to proceed into bubble inlets. As fluid in which the bubbles are entrained passes into the bubble inlets and through filter media, the bubbles are broken up so that they will not adversely affect an engine or other item to which the fluid passing through the filter is supplied. Once the bubble breaker 60 has eliminated unwanted air from the fuel or other fluid, "de-bubbled" fuel or fluid is discharged back into the fluid flow appropriately, for example upstream of the main filter element.

It will be understood from the description supplied that, in the arrangement shown in FIG. 2, by way of the bubble breaker 60, air pockets or bubbles in water-contaminated or dirty fluid are eliminated as that dirty or water-contaminated fluid is supplied under pressure from outside the second frame 46. Pre-processed fluid is produced as the water-contaminated or dirty fluid passes initially through the coalescer elements 40, and that pre-processed fluid then passes through the main filter element 10 in the direction 18. The resulting, partially filtered fluid then passes through the supplemental cleanliness medium filter element 12, and then fully filtered fluid is received by a central filter cavity or volume 24. The fully filtered fluid then passes out of the overall arrangement in the direction 34.

Figure 3:
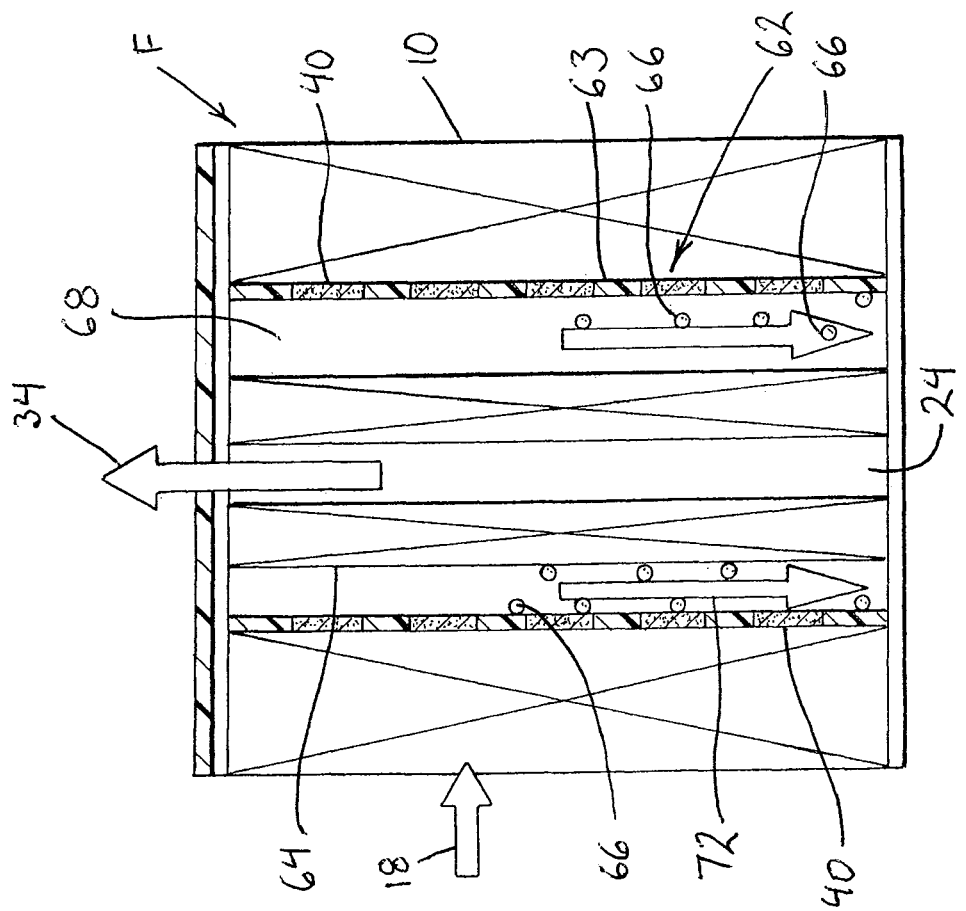
FIG. 3 is a sectional view of a compact three-stage design according to the invention.

FIG. 3 is a sectional view of a compact three-stage design in which a first stage, formed as an oval or flat main filter element, provides particle filtration, a second stage, mounted at a radially inner surface of the first stage, operates as a coalescer and provides hydrophilic water separation and structural support, and a third stage, formed by meltblown material with a base layer, a hydrophobic medium, a combination of hydrophilic and hydrophobic media, or a combined hydrophilic—hydrophobic layer, is at least partly hydrophobic to provide water separation.

FIG. 3, more specifically, shows a main filter element 10 to provide fine particle filtration, and a supplemental fluid processing element 62, defined by a coalescer. The coalescer has a frame 63 and multiple individual coalescer elements 40, essentially identical to the elements 40 shown in FIG. 2. FIG. 3 also has other characteristics in common with the arrangements shown in FIGS. 1-2, and an unnecessarily repetitive description of these characteristics is not provided. It is conceivable, of course, to utilize a combination of a main filter element 10 and a supplemental cleanliness medium filter 12 instead of just the main filter element 10 in the arrangement shown in FIG. 3. The supplemental fluid processing element 62 shown in FIG. 3 operates both to support the main filter element 10 and to filter or process filtered fluid exiting the main filter element 10 by increasing water droplet size, facilitating water repellency of the hydrophobic third stage. The hydrophobic third stage as illustrated is formed by an oval or flattened annulus 64 of water repellant material, such as meltblown material with a base layer, a hydrophobic medium, a combination of hydrophilic and hydrophobic media, or a combined hydrophilic—hydrophobic layer. Water droplets 66 are prevented by the layer 64 from passing, with the remainder of the fluid, from an outer filter interior cavity 68 to the inner central filter cavity or volume 24 and out of the arrangement in the direction 34. The separated water droplets 66 collect, by moving in a direction 72 within the outer filter cavity 68, in the outer filter cavity 68. Collected water droplets 66 can be drained from the outer filter cavity 68 appropriately, removed upon filter replacement, or returned to the fuel or other fluid being filtered without adverse consequences.

In operation, when the filter F shown in FIG. 3 is used in a fuel filtering application for an internal combustion engine, for example, water-contaminated or dirty fuel received from a fuel tank (not shown) passes in a substantially radial direction 18 through the main filter element 10 under pressure, and is thus filtered initially by the annular main filter element 10. The filtered fuel then passes through the coalescer elements 40, and water droplets 66, entrained in the fluid, are prevented by the annulus 64 from passing, with the remainder of the fluid, from the outer filter cavity 68 to the inner filter cavity 24. As a result, only de-watered fluid is permitted to pass out of the arrangement in the direction 34.

FIG. 4 is a sectional view of a compact three-stage design similar to that shown in FIG. 3, but in which the hydrophobic third stage is provided in a space with reduced volume. This design may further include a bubble breaker, in which case it would be a four-stage design. Again, the arrangement shown in FIG. 4 has many characteristics in common with the arrangements shown in FIGS. 1-3, and an unnecessarily repetitive description of these characteristics is not provided. FIG. 4, for example, shows the illustrated arrangement as including a main filter element 10, end caps 14 and 16, with the end cap 16 affixed to the underside of a filter container cover 17, a frame 63, a plurality of individual coalescer elements 40, and a central filter cavity or volume 24. Here, however, the hydrophobic third stage is formed by a water separating element 64 with a reduced axial length, received in and mounted to a circumferentially inner surface of the frame 63, such that an end 70 of the element 64 defines a boundary of the central filter cavity or volume 24.

In operation, when the filter F shown in FIG. 4 is used in a fuel filtering application for an internal combustion engine, for example, water-contaminated or dirty fuel received from a fuel tank (not shown) passes in the substantially radial direction 18 through the main filter element 10 under pressure, and is thus filtered initially by the annular main filter element 10. The filtered fuel then passes through the coalescer elements 40, and water droplets 66, entrained in the fluid, are prevented by the element end 70 from passing, with the remainder of the fluid, out of the central filter cavity or volume 24. Consequently, only filtered and partially, but adequately, de-watered fluid is permitted to pass out of the arrangement in the direction 34. Separated water droplets 66, repelled by the hydrophobic element 64, can collect in the cavity or volume 24 as they move away from the hydrophobic element 64 in a direction 76.

Figure 5:
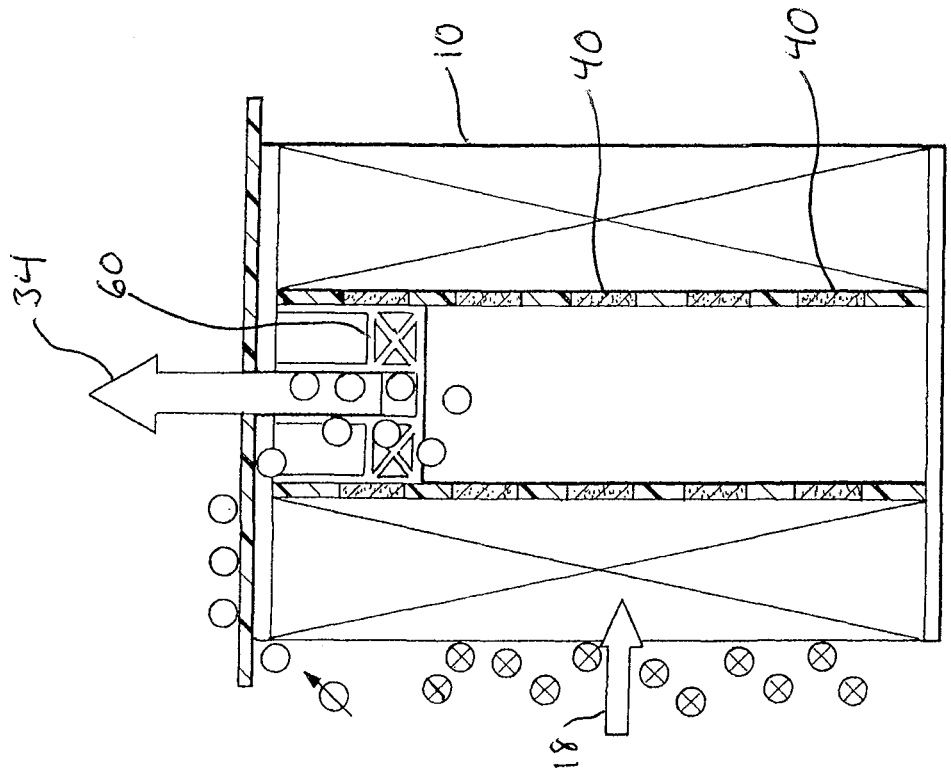
FIG. 5 is a sectional view of a compact five-stage design including a bubble breaker.

FIG. 5 is a sectional view of a compact four-stage design that is similar to the three-stage design shown in FIG. 4, but in which both the hydrophobic third stage, formed by water separating element 64 with a reduced axial length, and a supplemental cleanliness medium filter element 12 are provided in series with the main filter element 10 and a frame 63 receiving individual coalescer elements 40. This design may further include a bubble breaker 60, in which case it would be a five-stage design. In operation, when the filter F shown in FIG. 5 is used in a fuel filtering application for an internal combustion engine, for example, again, water-contaminated or dirty fuel received from a fuel tank (not shown) passes in a substantially radial direction 18 through the main filter element 10 under pressure, and is thus filtered initially by the annular main filter element 10. The filtered fuel then passes through the coalescer elements 40, and water droplets 66, entrained in the fluid, are prevented by the element 64 from passing, with the remainder of the fluid, out of the central filter cavity or volume 24. An end 70 of the element 64, again, forms a boundary of the cavity or volume 24. The water droplets collect in the central filter cavity or volume as they move in a direction 76 away from the hydrophobic third stage element 64. The supplemental cleanliness medium filter 12 is interposed between the hydrophobic element 64 and the filter outlet. Thus, only de-watered, twice-filtered fluid is permitted to pass out of the arrangement in the direction 34.

Figure 6:
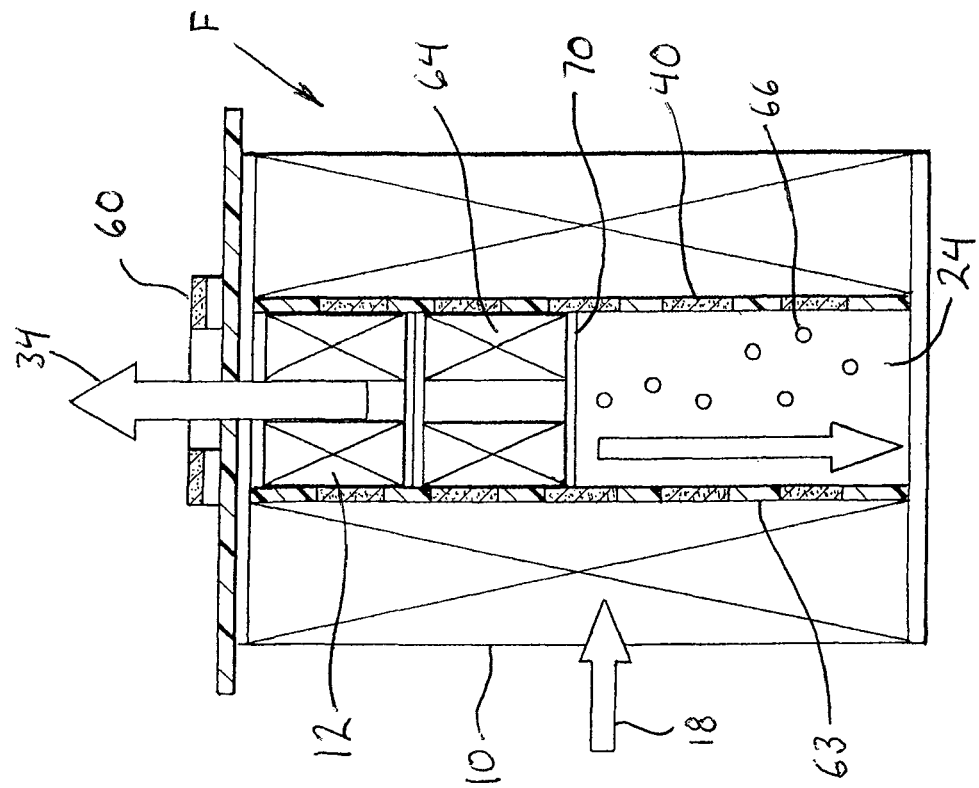
FIG. 6 is a sectional view of a main filter element with a coalescer and an internal bubble breaker associated therewith.

FIG. 6 is a sectional view of a main filter element 10 with a coalescer formed by individual coalescer elements 40 associated therewith. Fuel or other fluid is filtered as it traverses the filtration media of the main filter element 10 shown in FIG. 6 radially in the direction 18, and then passes through the coalescer, which, again, receives water-contaminated fuel, and serves to increase water droplet size. Flow through the arrangement shown in FIG. 6 proceeds in the directions indicated and exits the arrangement in the direction 34. The arrangement illustrated in FIG. 6 has a bubble breaker 60 that is fully integrated centrally within the filter element for air bypass around the filter media. An arrangement such as that shown in FIG. 6 operates to avoid passage of large, potentially damaging particles through the air bleed, permitting at most a constant air bleed with small bubbles. Periodic service (replacement) of the arrangement will involve replacement of the air bleed and avoids dirt build-up over the lifetime of the arrangement shown.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fluid filter configured for reception in a fluid filter container of minimized volume comprising:
    an annular main filter element through which fluid to be filtered can pass radially;
    a supplemental fluid processing element, including a first frame and multiple individual fluid processing elements, disposed within the main filter element to which fluid discharged from the main filter element passes;
    end caps between which opposite ends of both the main filter element and the supplemental fluid processing element are disposed and to which the opposite ends of both the main filter element and the supplemental fluid processing element are secured; and
    a second frame within which a plurality of individual coalescer elements are mounted surrounding the annular main filter element, one of the end caps to which adjacent ends of the main filter element and the supplemental fluid processing element are secured being attached to an underside of an axial end wall of the second frame;
    wherein fluid is discharged from a central volume of the filter through one of the end caps.

2. The fluid filter of claim 1, wherein the supplemental fluid processing element is a supplemental cleanliness medium element.

3. The fluid filter of claim 2, wherein the multiple individual fluid processing elements are multiple individual filter elements retained by the frame.

4. The fluid filter of claim 1, further comprising a device to dissolve bubbles in the fluid disposed on said axial end wall of the second frame.

5. The fluid filter of claim 1, wherein the second frame includes a protruding circumferential lip to define a seal and facilitate flow of the fluid.

6. The fluid filter of claim 1, wherein the second frame further includes another protruding circumferential lip permitting the fluid filter to be snapped into position within the fluid filter container.

7. The fluid filter of claim 1, wherein the fluid filter is a fuel filter for filtering gasoline or diesel fuel to be supplied to an internal combustion engine.

8. The fluid filter of claim 7, wherein the supplemental fluid processing element is a supplemental cleanliness medium element.

9. The fluid filter of claim 8, wherein the supplemental cleanliness medium element includes a frame and multiple individual fluid processing elements are multiple individual filter elements retained by the frame.

10. The fluid filter of claim 7, further comprising a device to dissolve bubbles in the gasoline or diesel fuel disposed on said axial end wall of the second frame.

11. The fluid filter of claim 7, wherein the second frame includes a protruding circumferential lip to define a seal and facilitate flow of the gasoline or diesel fuel.

12. The fluid filter of claim 7, wherein the second frame further includes another protruding circumferential lip permitting the fluid filter to be snapped into position within a fuel filter container.

* * * * *